3,324,098
POLYMERIZATION OF BUTENE-1 IN THE PRESENCE OF A MINOR AMOUNT OF ISOBUTYLENE
Billy D. Rice, Pasadena, and William P. Stadig, Houston, Tex., assignors to Petro-Tex Chemical Corporation, Houston, Tex., a corporation of Delaware
No Drawing. Filed Oct. 28, 1963, Ser. No. 319,545
3 Claims. (Cl. 260—93.7)

This invention relates to an improved process for polymerizing butene-1.

Butene-1 may be polymerized to a solid polymer with a metal halide-metal alkyl catalyst. The catalyst generally used in polymerizing alphaolefins is a titanium chloride activated with an aluminum alkyl such as triethyl aluminum, tributyl aluminum and the like. Polymerization of butene-1 in the presence of certain metal halide-metal alkyl catalyst under specific reaction conditions will produce isotatic poly(butene-1) polymer in varying yields. The polymers so produced may have a wide range of molecular weights and crystallinity depending on the condition of the process and/or the ratios of reactants employed. One procedure used for varying the stereoregularity of polyolefins and to vary catalyst activity is to vary the ratios of the ingredients making up the catalyst complex or to substitute other metal alkyls or metal halides in the catalyst.

It is an object of this invention to provide a simplified process for controlling catalyst activity in polymerizing butene-1 and the stereoregularity of poly(butene-1) formed. Another object is to obtain increased yields of poly(butene-1) per unit of catalyst at faster rates of polymerization. Other objects of this invention will be apparent from the description which follows.

These objects are accomplished quite unexpectedly by polymerizing butene-1 in bulk with a catalyst containing titanium trichloride, aluminum trichloride and a dialkyl aluminum chloride in the presence of a small amount of isobutylene. The amount of isobutylene used may be varied from about 0.001 to 0.16 mol of isobutylene per mol of butene-1. Preferably a mol ratio of from about 0.01 to 0.05–0.1 is employed. The type of polymer desired will partly determine the amount of isobutylene used. for example in a more flexible, less brittle, poly(butene-1) is desired, the higher amounts of isobutylene will be used.

The isobutylene may be added in the reactor before or after the butene-1 addition, or preferably mixed with the butene-1 prior to charging to the reactor. The manner or order of introduction the isobutylene does not appear to be critical. The isobutylene used preferably should be of high purity and not contain carbonyls or other oxygen containing contaminants which adversely affect catalyst activity.

The polymerization temperature preferably is from about 30° C. to less than 100° C. In accordance with this invention, the polymerization is conducted in a non-solvent or non-diluent bulk polymerization system. Diluents such as n-butane and propane are undesirable. The polymerization reaction may be conducted batchwise or continuously, the latter being preferable to realize all of the advantages of the invention.

The catalyst contains titanium trichloride, aluminum trichloride, preferably in molar ratios of about 3 to 1, and a dialkyl aluminum chloride wherein the alkyl groups contain 2 to 6 carbon atoms and preferable is ethyl. A titanium trichloride-aluminum trichloride mixture may be obtained by reducing titanium tetrachloride with aluminum, for example using one mol of aluminum mixed with 3 mols of titanium tetrachloride to form $3TiCl_3 \cdot AlCl_3$. A mol ratio of about 0.5 to two mols of titanium trichloride per mol of dialkyl aluminum chloride is preferred. Butene-1 to titanium trichloride ratios of 100 to 5,000 mols of butene-1 to one mol of titanium trichloride have been used.

This example illustrates the practice of the invention. A one-gallon stainless steel pressure autoclave was used which had a catalyst port consisting of a ¾ inch stainless steel tube 12 inches long with valves on both the inlet and outlet end and capable of being opened and closed from without the closed autoclave. The reactor was purged for 15 minutes with dry nitrogen gas. During the purging process the autoclave was heated to a temperature of 55° C. and was maintained at this temperature while the reactants were added. A catalyst mixture of 0.013 mol of finely powdered $3TiCl_3 \cdot AlCl_3$ having a particle size of between 5 to 25 microns, and 0.012 mol of aluminum diethyl chloride dissolved in about 0.1 mol of butene-1 was placed in the heated catalyst port. 800 grams of butene-1 containing 8.84 mol percent isobutylene was charged to the heated autoclave and the catalyst introduced into the butene-1. Another 800 grams of the butene-1–isobutylene mixture was then passed into the autoclave by passing it through the catalyst port. The total isobutylene used was 8.84 mol percent. When all the reactants were in the autoclave, external heating was discontinued and the temperature was maintained by the heat of reaction and a reflux condenser at 55±1° C. The reactants were agitated with a bottom zone propeller for 120 minutes. The polymerization reaction was then stopped by the addition of 500 mls. of heptane containing 5 volume percent of isopropyl alcohol. The polymer was removed from the autoclave, dissolved in normal heptane, washed with a 2 percent oxalic acid soluion and then by several water washes to remove the catalyst residue. The polymer solution was steam stripped to separate the polymer from the solvent. The polymer was granulated and vacuum dried to a constant weight. A polymer yield of 990 grams was obtained. The poly(butene-1) had a density of 0.890. Infra-red analysis showed that the polymer was wholly poly(butene-1), there being no copolymer of butene-1 and isobutylene present. Repeating this run with 1.29 mol percent isobutylene, poly(butene-1) having a density of 0.90 is obtained in improved yields. When the first run was repeated in the absence of isobutylene, a yield of only 311 grams of poly(butene-1) was obtained which had a density of 0.91. When the first run with isobutylene was repeated with other catalysts as titanium trichloride and triethyl aluminum or the ethyl aluminum sesquichloride, the unexpected improvement in yield and change in structure as reflected in the density, due to the presence of isobutylene, was not obtained.

We claim:
1. A method for polymerizing butene-1 which comprises contacting butene-1 with a catalyst containing titanium trichloride, aluminum trichloride and a dialkyl aluminum chloride in the presence of 0.001 to 0.16 mol of isobutylene per mol of butene-1.

2. A method for polymerizing butene-1 which comprises contacting butene-1 in liquid phase and 0.01 to 0.1 mol of isobutylene per mol of butene-1 with a catalyst comprising titanium trichloride and aluminum trichloride in a molar ratio of about 3 mols of titanium trichloride to 1 mol of aluminum trichloride, and diethyl aluminum chloride present in a molar ratio of 1 mol per 0.1 to 3 mols of titanium trichloride at a temperature from about 30° C. to less than 100° C.

3. A method for polymerizing butene-1 which comprises contacting liquid butene-1 and 0.05 to 0.1 mol of isobutylene per mol of butene-1 with a catalyst comprising titanium trichloride and aluminum trichloride in a molar ratio o fabout 3 mols of titanium trichloride to 1 mol of aluminum trichloride, and diethyl aluminum chloride present in a molar ratio of about 1 to 1 mol of titanium trichloride at a temperature of about 55° C., said catalyst being present in a molar ratio of one mol of titanium trichloride to 100 to 5,000 mols of butene-1.

References Cited
UNITED STATES PATENTS

| | | | |
|---|---|---|---|
| 2,920,066 | 1/1960 | Nowlin | 260—94.9 |
| 3,029,231 | 5/1962 | Van Amerongen | 260—94.9 |
| 3,032,510 | 5/1962 | Tornqvist | 260—94.9 |
| 3,251,819 | 5/1966 | Kettey | 260—93.7 |
| 3,296,232 | 1/1967 | Cleary | 260—88.2 |

JOSEPH L. SCHOFER, *Primary Examiner.*

M. B. KURTZMAN, *Assistant Examiner.*